Sept. 27, 1960 M. J. KIDDER 2,953,816
SHOT SHELL WAD MOLDING PROCESS
Filed Aug. 31, 1955
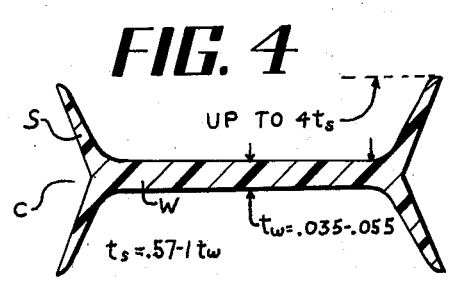
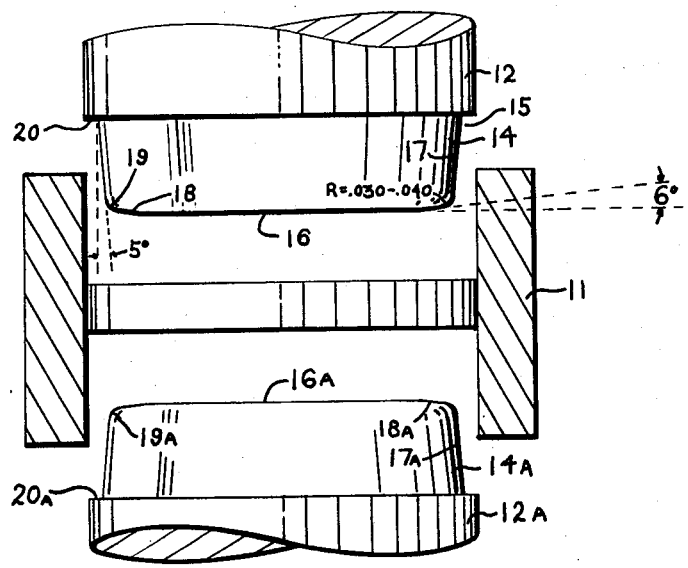
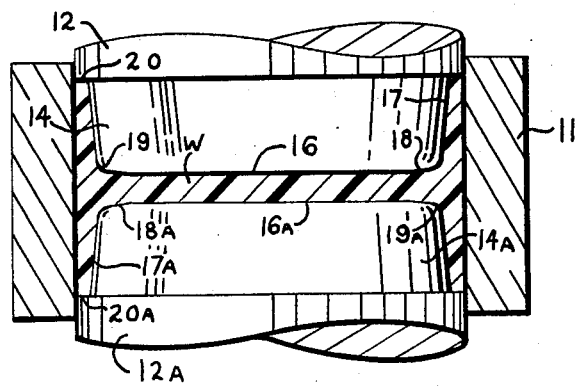
INVENTOR.
MARSHALL J. KIDDER

United States Patent Office 2,953,816
Patented Sept. 27, 1960

2,953,816

SHOT SHELL WAD MOLDING PROCESS

Marshall J. Kidder, Fairfield, Conn., assignor to Remington Arms Company, Inc., Bridgeport, Conn., a corporation of Delaware Filed Aug. 31, 1955, Ser. No. 531,676

5 Claims. (Cl. 18—55)

This invention relates to the manufacture of shaped articles such as wads for shot shells, and contemplates the production of such articles by the extrusion of suitable plastic materials at room temperature.

In the drawings:

Fig. 1 is a fragmentary enlarged elevation of a disk-like blank from which a formed wad is to be extruded.

Fig. 2 is a fragmentary enlarged sectional elevation of the open die in which the blank of Fig. 1 is placed for the purpose of extrusion.

Fig. 3 is a fragmentary enlarged sectional elevation of the die in closed position, with a formed wad therein.

Fig. 4 is an enlarged sectional elevation of one type of formed wad.

By way of illustration the process is described with reference to the production of a shot shell wad of the type embodying a planar disk from which a cup-like flange extends in each direction from the plane of the disk. In cross section the finished article has roughly the shape of a letter H.

Shot shell wads are ordinarily made either by cutting disks from a flat sheet or by the molding of moldable materials such as the synthetic thermoplastics and admixtures of granular and/or fibrous materials with a flowable binder. According to the prior art, the plastic or the binder has been made flowable either by heating or by the use of a plasticizer or a fluid which is expelled in the process of molding and/or subsequently evaporated. If the material is thermoplastic it must be preheated to a temperature adequate to enable it to conform to the configuration of the mold and must remain in a relatively cold mold for a time sufficient to rigidify the product to such an extent that it can withstand handling on its removal from the mold without permanent distortion.

The present invention contemplates extruding plastic materials at room temperature and enables the rapid production of formed wads without pre-heating the material and without holding the molded article in the mold during a period in which the temperature is reduced to rigidify the product and without any curing or other process subsequent to ejecting the wads from the mold.

Suitable materials are the synthetic polymers, usually of the thermoplastic type. Thermoplastic elastomers, such as polyethylene, styrene butadiene copolymer, styrene butadiene acrylonitrile, cellulose acetate and ethyl cellulose, are preferred, although the invention is not limited to any particular plastic.

By way of illustration, the invention will be described as applied to the manufacture of a wad which is symmetrical with respect to a medial plane parallel to the web faces. In section the mold is of H configuration (Fig. 3), while the section of the product (Fig. 4) may be described as a double Y or an H with a centrally disposed cusp in the flange thereof.

In process, a disk-shaped blank B is prepared, usually by cutting from a flat sheet, the diameter of the blank being somewhat greater than the desired diameter of the finished wad and the thickness of the blank being substantially greater than the thickness desired for the web of the finished wad. Such a blank is inserted in a cylindrical die 11, the diameter of the die preferably being such as to frictionally hold the blank centered with respect to punches 12 and 12a which are arranged for reverse reciprocation relative to die 11. As illustrated, the punches are of identical configuration, with a view to producing wads which can be used either side up instead of requiring orientation prior to insertion into a shot shell body. The nose portion 14 of each punch is of reduced diameter, defining an annular cavity 15 of a width which determines the average thickness of the wad flange or skirt S. The mid-portion of the end face 16 of each punch is disposed substantially at right angles to the punch axis and is joined to the peripheral surface 17 by a slightly inclined annulus 18 and a radius 19. The peripheral surface 17 is preferably tapered somewhat, say at an angle of about 5°, this taper controlling the taper of the wad skirt in a manner to be described.

Prior to insertion in the die, the wads are lubricated with a soap, preferably one which is about 95% anhydrous and does not contain more than about .05% free alkali. The soap may conveniently be applied by immersing the blanks in a 1% to 2% solution of the soap at a temperature of about 130°–140° F., for a brief time, then removed and dried, preferably with tumbling, to obviate adhesion. The soap lubrication has been found quite important to successful extrusion.

The wad blank B being in place in the die, the two punches are advanced to engage the blank and extrude a part of the material thereof into the annular cavity.

To secure useful wads, it has been found essential that the two punches advance at substantially the same rates. If one of the punches is stationary, or moves more slowly than the other, the result is a misshapen and distorted wad. The skirt S on the side of the wad adjacent the more rapidly moving punch is longer than the skirt on the opposite side and tends to be irregular, and the web W of the wad is concave in the direction of the more rapidly moving punch. Upon being subjected to the pressure of two punches advancing at substantially the same rates, the plastic in the mid-portion of the blank flows first radially outwardly and then generally axially, to fill the cavity between the die wall and the punch tips.

The results of first closing the die with a blank B in place and then opening the die are unique, and the mechanism of the displacement of the plastic perhaps not fully understood. The resulting wad is shown in Fig. 4. What is believed to be the configuration of the plastic when the die is fully closed, with the punches at their point of maximum advance, is shown in Fig. 3. The plastic substantially completely fills the cavity bounded by the cylindrical die, the reduced diameter punch tips 14 and the space between the punch faces 16. The thickness of the web W of the finished wad is approximately one-half the thickness of the blank B. It is impracticable to ascertain the space between the faces 16 of the two punches at the point of their maximum advance, but it appears that this spacing is less than the web thickness, for the following reasons: The periphery of the wad after removal from the die, instead of being cylindrical, comprises an annular cusp C of substantially V-shape, the skirts S being inclined outwardly from the web W. There is little if any cylindrical surface at the tips of said cusp. The ends of the skirts S may comprise a flat annulus, but the width of this annulus is less than the width of the punch shoulders 20, and the annulus merges with the interior of the skirt wall in a curve as shown in Fig. 4. The two walls of the inclined skirts relatively diverge from their free ends toward the web in an angle which corresponds generally to but tends to be somewhat greater than the angle of 5° between the periphery 17 of the punch tips and the cylindrical wall of the die.

The outside diameter of the wad as measured across the open ends of the skirts is somewhat less than the diameter of the die, and the depth of the skirts tends to be somewhat less than the height of the punch tips 14. For example, if the die diameter is .770", the wad diameter will be between .760" and .755"; and if the die diameter is .720", the wad diameter will be between .710" and .705". It may be theorized that as the punches engage the blank and deform the outward flow of the plastic stock is resisted by a radial stress within the part of the stock remaining between the dies and that this stress is of such magnitude that when the punches are withdrawn from the blank a considerable elastic recovery occurs, some of the material displaced from the web returning thereto. Radial stress is indicated by the fact that the wads cling tightly to the punches and considerable force is required to dislodge them. The stress being radial, and the part of the stock which has been subjected to the least plastic flow and therefore is under the greatest stress being in the plane of the web, the maximum elastic recovery is radial and in the plane of the web, and the result is the peripheral cusp C.

That the cusp C is produced by elastic recovery, and not by a separation of the stock at the periphery of the blank, is further shown as follows: An annular groove in the wall of die 11 opposite the blank results in an annular bead in the bottom of the cusp, the dimensions of the bead being comparable to the dimensions of the groove. Such a groove elsewhere in the die periphery results in a bead on the skirt wall which tends to be of lesser dimensions than the dimensions of the groove. A line such as a pencil mark on the periphery of the blank extending between the faces shows on the periphery of the finished wad (Fig. 4) as a continuous mark extending transversely through the cusp. However, if the punch noses 14 are lengthened to such an extent that the depth of each annular cavity 15 is more than about four times its width, the mark shows a discontinuity in the region of the bottom of the cusp C and the wad tends to split or laminate in this region. Accordingly, the punches should be so proportioned that the length of the wad skirt does not exceed about four times the average thickness of such skirt.

Considering by way of example a wad for a 12 gauge shot shell, the thickness of the blank B is from .087" to .096", preferably about .090"; and the thickness of the web of the finished wad (Fig. 4) is between .035" and .055", a thickness of about .045" being preferred. Wads with thicker webs frequently break on firing under adverse conditions, and wads with thinner webs distort on being removed from the die. These measurements are taken not less than about thirty minutes after the wad has been removed from the die, during which interval the web thickness increases some .002" or .003" over its thickness when first withdrawn from the die. Thereafter, the wad is substantially dimensionally stable. This web thickness is materially less than the web thickness required for wads which are hot molded from the same material. If a molded wad is made with a web of a thickness comparable with the web thickness of the extruded wad of this invention the web is ruptured on firing.

The outside diameter of the wad as stabilized is somewhat less than the diameter of the die 11, as above noted.

The thickness of the skirt S may vary from the thickness of the web down to about 57% of the thickness of the web. Outside of these proportions the wad is distorted and useless. The length L of skirt S should not exceed four times the skirt thickness, otherwise the web tends to split, as above noted. The radius R between web and skirt is between .030" and .040"—a lesser radius produces break-ups on firing, a greater radius increases extrusion difficulty, produces wavy skirt ends and a tendency of the wad material to laminate.

Shooting tests on wads made according to the present invention in comparison with hot molded wads of the same material show the extruded wads to be definitely superior. Material, wad diameter, etc., being identical, the leading of the extruded wad as compared to the molded wad is about equal. Excellent gas sealing can be secured, particularly if the wads are made of maximum diameter. Extruded wads recovered after firing tests showed much less distortion and break-up than molded wads.

What is claimed is:

1. In the process of cold impact forming a shaped article having a central web and peripherally disposed axially extending skirts from a flat disc of synthetic organic elastomer, the steps comprising simultaneously applying like impacting forces by opposed reciprocable punches advancing at substantially identical speed to opposed faces of said disc over a central web area of lesser diameter than that of the disc to compress said central web area and cause radial extrusion of material therefrom, and confining outward flow of said extruded material at the peripheral extent of said disc by a cylindrical die surrounding said reciprocable punches to cause axial flow of extruded material in opposed directions to form said skirts.

2. A process according to claim 1, in which said elastomer is an ethylene polymer.

3. In the process of making a shaped article having a central web and peripherally disposed, axially extending flared skirts from a flat disc of synthetic organic elastomer, the steps comprising applying like impacting forces at like rates simultaneously to opposed faces of said disc over a central web area of lesser diameter than that of the disc to cause radial extrusion of material from said web area and radially stress material remaining in said web area; confining outward flow of said extruded material at the periphery of said disc by a cylindrical die surrounding said disc, thus causing axial flow of extruded material to form said skirts; then removing radial stress from said web area whereby said web area radially constricts to a lesser diameter than that of said extruded skirts.

4. A process according to claim 3, in which said impacting forces reduce said central web area to approximately one-half the thickness of the original disc.

5. In the process of cold impact forming a flat disc of synthetic organic elastomer into a shaped article having a central web with opposed, axially extending skirts at the peripheral margin of said web defining a cusp, the steps comprising applying a substantially anhydrous soap lubricant to the disc, compressing a central web area of less than disc diameter between opposed punches by applying like impact forces at like rates simultaneously to opposed faces of said disc through said punches, thereby causing radial extrusion of a portion of material from said web area and establishing a radial stress in material remaining in the web area, confining outward flow of said extruded material at the peripheral extent of said disc by a cylindrical die surrounding said disc to cause axial flow of said extruded material for formation of said skirts, and releasing said impacting forces from said radially stressed web whereby said cusp is formed by elastic recovery of said radially stressed material.

(References on following page)

References Cited in the file of this patent

UNITED STATES PATENTS

| Number | Name | Date |
|---|---|---|
| 1,659,649 | Ernst | Feb. 21, 1928 |
| 1,702,278 | Simons | Feb. 19, 1929 |
| 2,073,609 | Court | Mar. 16, 1937 |
| 2,244,208 | Miles | June 3, 1941 |
| 2,314,838 | Kingston | Mar. 23, 1943 |
| 2,440,806 | Megow et al. | May 4, 1948 |
| 2,444,420 | Borkland | July 6, 1948 |
| 2,536,316 | Schwarz | Jan. 2, 1951 |
| 2,589,419 | Moncrieff | Mar. 18, 1952 |
| 2,608,334 | Knocke | Aug. 26, 1952 |
| 2,635,289 | Owens | Apr. 21, 1953 |
| 2,661,499 | James et al. | Dec. 8, 1953 |
| 2,692,406 | Rhodes et al. | Oct. 26, 1954 |
| 2,748,464 | Kaul | June 5, 1956 |
| 2,748,932 | Kaul | June 5, 1956 |
| 2,777,162 | Banzhof | Jan. 15, 1957 |
| 2,782,921 | Norman | Feb. 26, 1957 |